(12) United States Patent
Battermann et al.

(10) Patent No.: US 9,988,011 B2
(45) Date of Patent: Jun. 5, 2018

(54) VEHICLE HAVING A PEDESTRIAN PROTECTION SYSTEM

(71) Applicant: DAIMLER AG, Stuttgart (DE)

(72) Inventors: Jens Battermann, Schömberg (DE); Christian Burczyk, Stuttgart (DE); Klaus Grewing, Althengstett (DE); Till Heinrich, Stuttgart (DE); Sven Kraß, Stuttgart (DE); Bengt Larsson, Sindelfingen (DE); Franz Maier, Alfdorf (DE); Uwe Merz, Stuttgart (DE); Abdulkadir Oeztuerk, Gärtringen (DE); Marica Paurevic, Herrenberg (DE); Marco Wötzel, Nufringen (DE)

(73) Assignee: DAIMLER AG, Stuttgart (DE)

( * ) Notice: Subject to any disclaimer, the term of this patent is extended or adjusted under 35 U.S.C. 154(b) by 0 days. days.

(21) Appl. No.: 15/328,162

(22) PCT Filed: Jul. 7, 2015

(86) PCT No.: PCT/EP2015/001380
§ 371 (c)(1),
(2) Date: Jan. 23, 2017

(87) PCT Pub. No.: WO2016/012077
PCT Pub. Date: Jan. 28, 2016

(65) Prior Publication Data
US 2017/0217400 A1    Aug. 3, 2017

(30) Foreign Application Priority Data

Jul. 24, 2014    (DE) .................. 10 2014 010 872

(51) Int. Cl.
*B60R 21/36* (2011.01)
*B60R 21/38* (2011.01)

(52) U.S. Cl.
CPC .............. *B60R 21/36* (2013.01); *B60R 21/38* (2013.01)

(58) Field of Classification Search
CPC ................................ B60R 21/36; B60R 21/38
See application file for complete search history.

(56) References Cited

U.S. PATENT DOCUMENTS

| 6,415,883 B1 | 7/2002 | Myrholt et al. |
| 9,308,886 B1 * | 4/2016 | Hwang .................. B60R 21/38 |

(Continued)

FOREIGN PATENT DOCUMENTS

| DE | 10013563 A1 | 10/2001 |
| DE | 10020660 A1 | 10/2001 |

(Continued)

OTHER PUBLICATIONS

Search Report dated Nov. 13, 2017 in related EP Application No. 15 736 786.3.

(Continued)

*Primary Examiner* — Drew J Brown
(74) *Attorney, Agent, or Firm* — Patent Portfolio Builders PLLC

(57) ABSTRACT

A vehicle includes a pedestrian protection device having a car hood that can be opened on at least one edge facing the windscreen when a collision of a person against the vehicle is recognized. The device also includes at least one airbag, which in the triggered state, extends across a region of a windscreen pillar and a region of the windscreen adjacent to this.

5 Claims, 9 Drawing Sheets

(56) References Cited

U.S. PATENT DOCUMENTS

Figure 1:
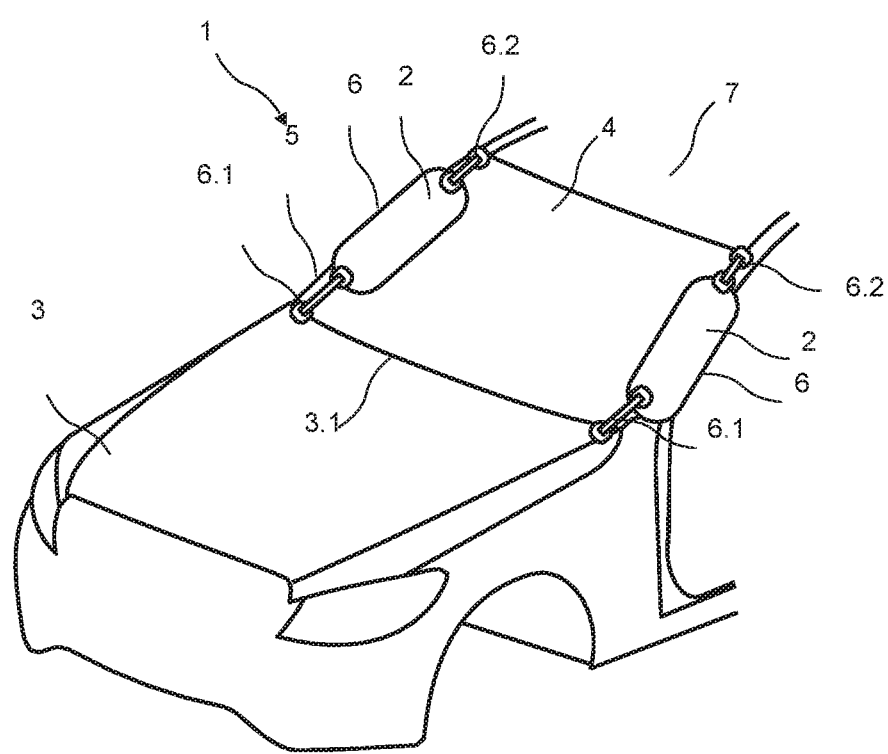

| | | | | |
|---|---|---|---|---|
| 9,834,171 | B2* | 12/2017 | Thomas | B60R 21/36 |
| 2004/0182629 | A1* | 9/2004 | Takahashi | B60R 21/013 |
| | | | | 180/274 |
| 2006/0175844 | A1* | 8/2006 | Neal | B60R 21/38 |
| | | | | 292/340 |
| 2008/0189015 | A1* | 8/2008 | Borg | B60R 21/38 |
| | | | | 701/45 |
| 2010/0263957 | A1* | 10/2010 | Shaw | B60R 21/38 |
| | | | | 180/281 |
| 2010/0270813 | A1 | 10/2010 | Roth et al. | |
| 2014/0132036 | A1* | 5/2014 | Fritzon | B62D 25/105 |
| | | | | 296/193.11 |
| 2014/0158450 | A1* | 6/2014 | Hasselblad | B60R 21/38 |
| | | | | 180/274 |
| 2016/0375856 | A1* | 12/2016 | Osanai | B60R 21/36 |
| | | | | 180/274 |

FOREIGN PATENT DOCUMENTS

| | | | | |
|---|---|---|---|---|
| DE | 10332365 | A1 | 2/2005 | |
| DE | 102004029757 | A1 | 1/2006 | |
| DE | 102007034556 | A1 | 1/2009 | |
| EP | 1176062 | A2 | 1/2002 | |
| EP | 2105358 | A1 | 9/2009 | |
| JP | 2002036986 | A * | 2/2002 | B60R 21/36 |
| JP | 2006076448 | A | 3/2006 | |
| JP | 2006096224 | A | 4/2006 | |
| JP | 2007191102 | A | 8/2007 | |
| JP | 2008307956 | A | 12/2008 | |
| WO | 02079009 | A1 | 10/2002 | |

OTHER PUBLICATIONS

International Search Report dated Sep. 22, 2015 in related International Application No. PCT/EP2015/001380.

Written Opinion dated Sep. 22, 2015 in related International Application No. PCT/EP2015/001380.

Office Action dated Nov. 28, 2017 in related JP Application No. 2017-501405.

* cited by examiner

VEHICLE HAVING A PEDESTRIAN PROTECTION SYSTEM

BACKGROUND AND SUMMARY OF THE INVENTION

Exemplary embodiments of the invention relate to a vehicle having a pedestrian protection device comprising a car hood that can be opened on at least one edge facing a windscreen when a collision of a person against the vehicle is recognized.

In general, pedestrian protection devices for vehicles that comprise a car hood that can be actively opened and/or an airbag that can be triggered are known. When a collision of a person against the vehicle is recognized the car hood can be opened at least in a region facing a windscreen, wherein the airbag substantially covers the windscreen to protect the person from colliding with it.

Exemplary embodiments of the invention are directed to a vehicle having a pedestrian protection device that is an improvement over the prior art.

According to an aspect of the present invention, a vehicle has a pedestrian protection device comprising a car hood that can be opened on at least one edge facing a windscreen when a collision of a person against the vehicle is recognized. According to the invention, at least one airbag is additionally provided which, in the triggered state, extends across a region of a windscreen pillar and a region of the windscreen adjacent to this.

The at least one airbag extends a protection region of the pedestrian protection device around the region of the windscreen pillar and a windscreen root.

A visibility region of a driver of the vehicle is slightly to not at all permanently limited by means of such an airbag.

BRIEF DESCRIPTION OF THE DRAWING FIGURES

Exemplary embodiments of the invention are illustrated in greater detail below by means of drawings.

Figure 2:
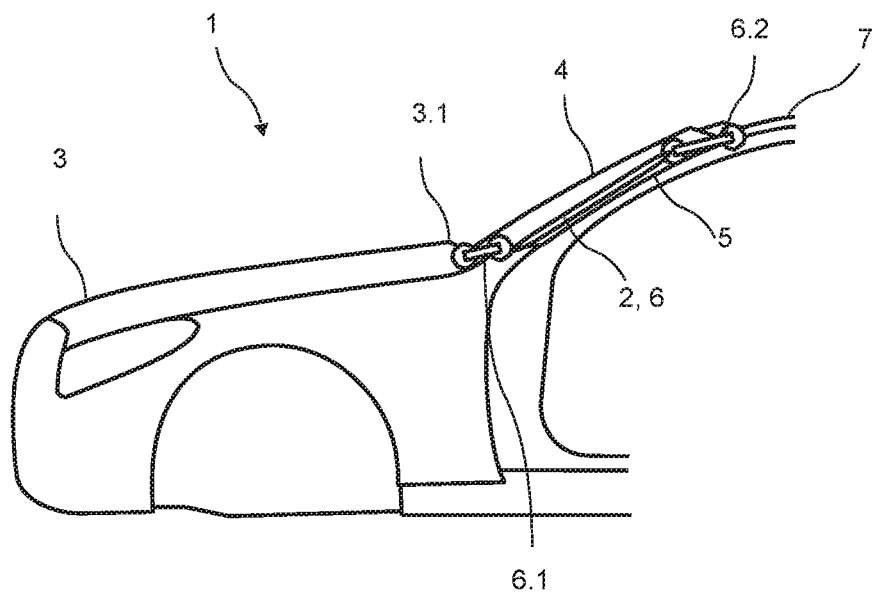
Figure 3:
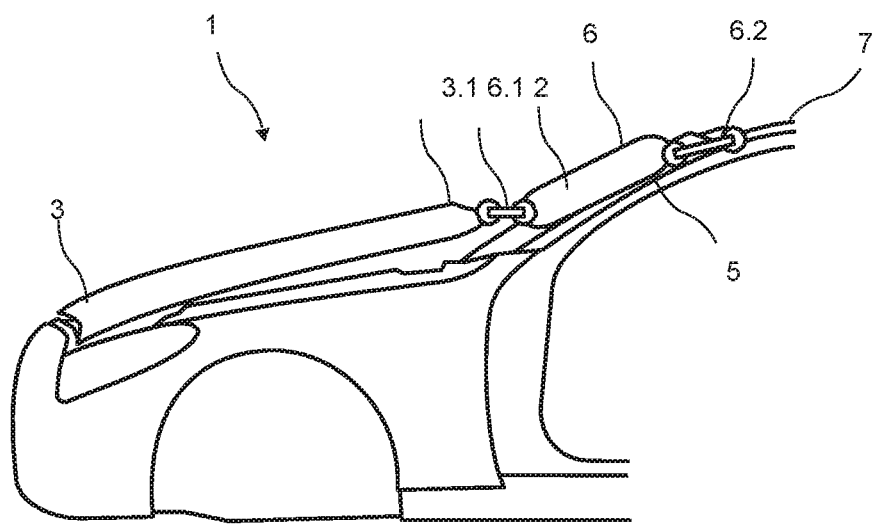
Figure 4:
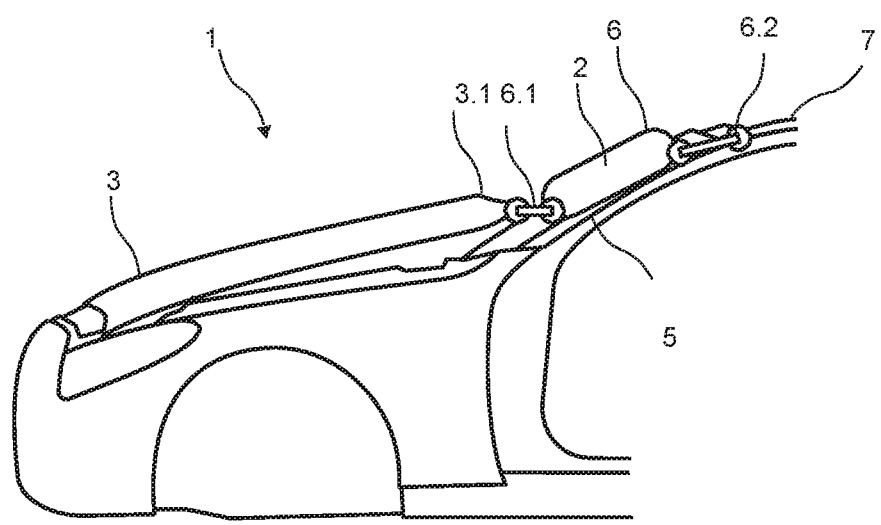
Figure 5:
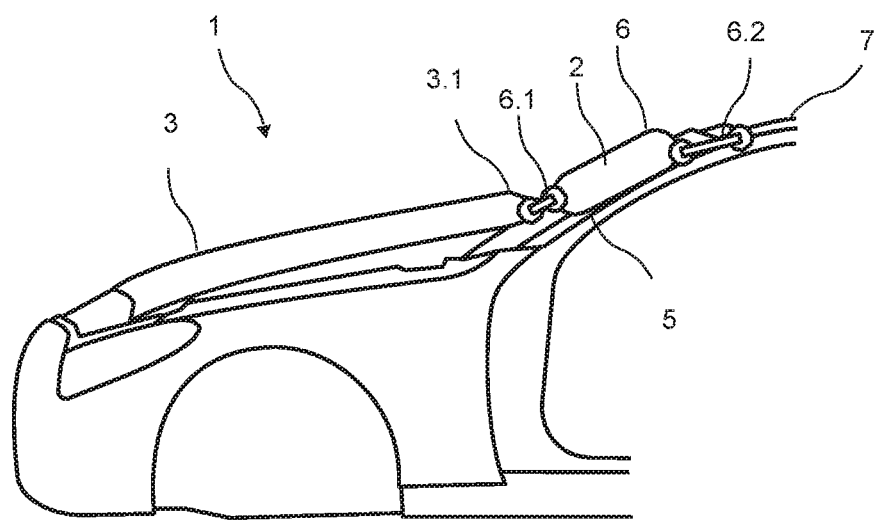
Figure 6:
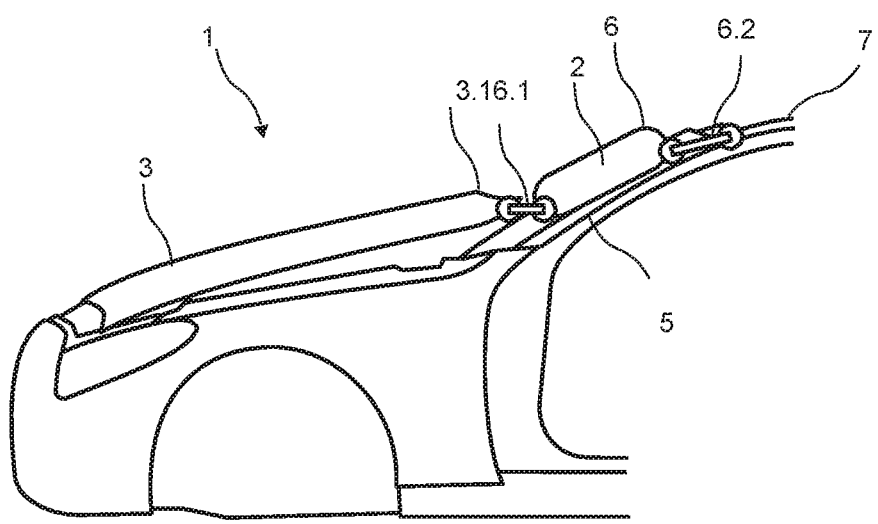
Figure 7:
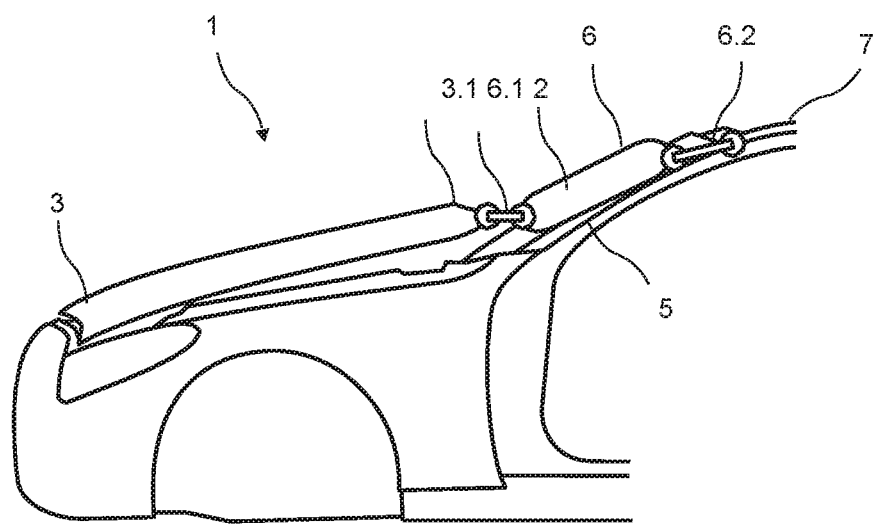
Figure 8:
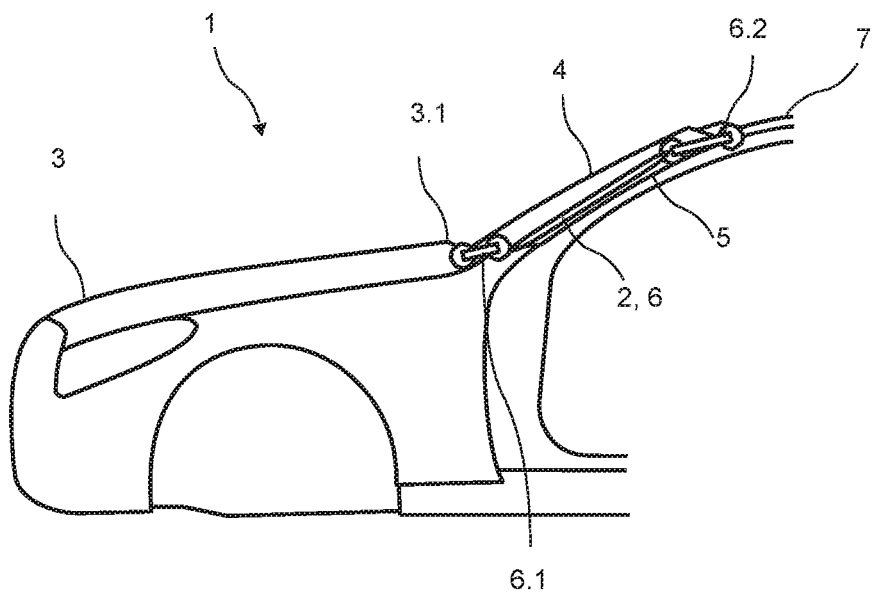
Figure 9:
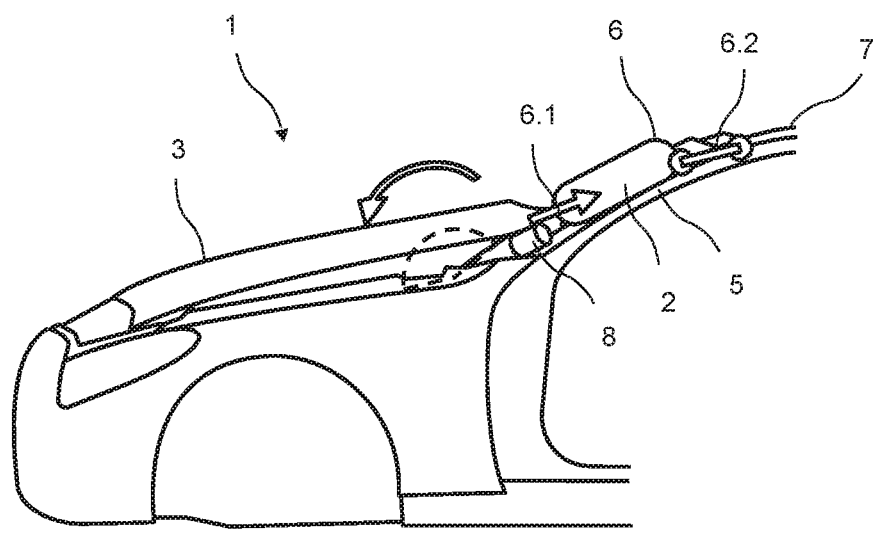

Here are shown:

FIG. 1 schematically, a perspective view of a front region of a vehicle having two triggered airbags, FIG. 2 schematically, a side view of the front region with the airbags in the untriggered state, FIG. 3 schematically, a side view of the front region with a partially opened car hood and triggered airbags, FIG. 4 schematically, a further side view of the front region with a partially opened car hood and triggered airbag, FIG. 5 schematically, a side view of the front region with an opened car hood and triggered airbags, FIG. 6 schematically, a side view of the front region when returning the car hood into a starting position, FIG. 7 schematically, a further side view of the front region when returning the car hood, FIG. 8 schematically, a side view of the front region with a returned car hood, and FIG. 9 schematically, a side view of the front region with an opened car hood in a possible embodiment.

Parts that correspond to one another are provided with the same reference numerals in all figures.

DETAILED DESCRIPTION

A perspective view of a front region of a vehicle 1 having two triggered airbags as additional components of a pedestrian protection device is depicted in FIG. 1.

The pedestrian protection device additionally comprises a car hood 3 that can be moved in the direction of a windscreen 4 on recognising a collision of a person against the vehicle 1 and is able to be raised on an edge 3.1 facing the windscreen 4.

The two airbags 2 extend across a region of a respective windscreen pillar 5 of the vehicle 1 shown among other things in FIG. 2 and have a substantially cylindrical shape. Both airbags 2 and an associated actuator system are arranged in a fabric tube 6. As an alternative to the cylindrical shape, the airbags 2 can also have different shapes, such as an oval shape, for example.

An end 6.1 of the respective fabric tube 6 is fixed to the edge 3.1 of the car hood 3 and a further end 6.2 is fixed in the region of a front roof frame cross-member of a vehicle roof 7. It is also conceivable that an end 6.1 is arranged in the region of a hinge of the car hood 3. The further end 6.2 can alternatively or additionally be arranged and fixed in the region of the windscreen pillar 5.

FIG. 2 shows a side view of the front region of the vehicle 1, wherein the airbags 2 are depicted in the untriggered state.

In the untriggered state, the respective airbag 2 is arranged below a decorative element that conceals the windscreen pillar 5 and is not depicted in more detail such that it is not able to be seen in the figure.

When a person collides with the vehicle 1, the two airbags 2 can be triggered and the car hood 3 is unlocked for opening and sectional shifting.

FIGS. 3 to 5 respectively show a movement phase when opening the car hood 3 that interacts with the two airbags 2.

A collision of a person against the vehicle 1 has been recognised, wherein the collision exceeds a predetermined threshold value such that the airbags 2 and the car hood 3 are actuated.

The airbags 2 are supplied with a gas such that they unfold and their volumes increase, whereby the fabric tube 6 of the respective airbag 2 shortens.

The respective fabric tube 6 is fixed to the edge 3.1 of the car hood 3 such that a traction force at least for supporting the opening of the car hood 3 is exerted on this by shortening the fabric tube 6. As described above, the respective fabric tube 6 can alternatively be fixed in the region of a hinge of the car hood 3.

In FIG. 4, the fabric tube 6 has been shortened even further in comparison to a first movement phase shown in FIG. 3, whereby the car hood 3 is able to be opened further.

FIG. 5 shows a further movement phase of the car hood 3 and also the airbags 2, wherein the car hood 3 is able to be shifted in the direction of the windscreen 4 by means of the fabric tubes 6 shortening because of the volume increase of the airbags 2 such that a so-called wiper shaft or cowl of the vehicle 1 is at least partially covered by means of the car hood 3 as injury protection.

In the present exemplary embodiment according to FIG. 5, both the airbags 2 and the car hood 3 have their functional position at least to reduce a risk of injury to the person colliding with the vehicle 1.

FIGS. 6 to 8 respectively show a movement phase when returning the car hood 3 into its starting position.

The two airbags 2 have a predetermined lifetime such that a pressure inside the airbags 2 is continuously reduced after the end of the lifetime. Thus, the volume of the airbags 2 reduces such that the fabric tubes 6 lengthen and the car hood 3 is positioned into its starting position, which is depicted in FIG. 8.

When the starting position is reached, the gas is released from the airbags 2 as much as possible such that the respective fabric tube 6 has its starting length such that there is no longer any traction force being exerted on the car hood 3 and it adopts its starting position.

FIG. 9 shows the car hood 3 in the opened state, wherein, in addition to the airbags 2, a spring element (not depicted in more detail) in the shape of a torsion bar spring and an airbag element are provided as cushioning elements 8.

With a traction force being exerted on the car hood 3 by means of the airbag 2, the torsion bar spring twists because of the shortening of the fabric tubes 6 necessitated by the volume increase such that this is able to be pretensioned when opening the car hood 3.

If the volume of the airbags 2 reduces, the fabric tubes 6 lengthen such that a traction force is no longer exerted on the car hood 3. The torsion bar spring releases and the car hood 3 is positioned in the direction of its starting position because of the effective spring force.

When opening the car hood 3 into the effective position, the cushioning element 8 that is arranged in the region of the edge 3.1 of the car hood 3 is able to be automatically filled. By means of the cushioning element 8, cushioning of the opened car hood 3 on impact can be adjusted.

For example, the cushioning element 8 is a component of an airbag 2 for opening the car hood 3. Thus, the application of a cushioning element 8 having different traction and pressure steps is conceivable.

Alternatively or additionally, a different cushioning element can also be arranged in the region of the edge 3.1 of the car hood 3.

Although the present invention has been described above by means of embodiments with reference to the enclosed drawings, it is understood that various changes and developments can be implemented without leaving the scope of the present invention, as it is defined in the enclosed claims.

The invention claimed is:

1. A vehicle having a pedestrian protection device, comprising:

a hood configured to be opened at least on an edge of the hood facing a windscreen in response to identifying a collision of a person against the vehicle, wherein the hood is also configured to be shifted in a direction of the windscreen in response to identifying the collision; and at least one airbag, which, in a triggered state, extends across a region of a windscreen pillar and exerts a traction force on the hood that moves the hood in the direction of the windscreen.

2. The vehicle of claim 1, wherein
   the at least one airbag has a cylindrical or oval shape and is arranged in a fabric tube,
   the fabric tube is fixed with
   a first end to the edge of the hood or in a region of a hinge of the hood, and
   a second end of the fabric tube in a region of a roof frame cross-member of a vehicle roof, a body of the vehicle, the windscreen pillar, or a roof frame.

3. The vehicle of claim 1, wherein
   the at least one airbag is arranged in a fabric tube, and
   the fabric tube is fixed on
   a first side to the edge of the hood or in a region of a hinge of the hood, and
   a second side in a region of a front roof frame cross-member of a vehicle roof, a body of the vehicle, the windscreen pillar, or a roof frame,
   such that, when the at least one airbag unfolds, the fabric tube shortens and the traction force is exerted on the hood.

4. The vehicle of claim 1, wherein the at least one airbag is arranged in a fabric tube and the hood is shiftable in the direction of the windscreen by the fabric tube shortening due to a volume increase of the at least one airbag.

5. The vehicle of claim 1, wherein in an untriggered state the airbag is arranged below a decorative element or a covering element that conceals the windscreen pillar.

\* \* \* \* \*